United States Patent [19]

Graham et al.

[11] 3,926,826

[45] Dec. 16, 1975

[54] MAGNETIC TAPE BINDER FROM A POLYURETHANE, A POLYOL AND AN ISOCYANATE

[75] Inventors: Boynton Graham, Wilmington; H. Gilbert Ingersoll, Hockessin, both of Del.

[73] Assignee: E. I. Du Pont de Nemours and Company, Wilmington, Del.

[22] Filed: June 18, 1973

[21] Appl. No.: 370,714

[52] U.S. Cl. ........... 252/62.54; 117/235; 260/37 N; 260/77.5 AQ; 260/858; 260/42.53

[51] Int. Cl.$^2$ ...................... H01F 1/113; H01F 1/28

[58] Field of Search.................. 252/62.54; 117/235; 260/37 N

[56] References Cited

UNITED STATES PATENTS

| | | | |
|---|---|---|---|
| 3,149,995 | 9/1964 | Bauer | 252/62.54 |
| 3,418,161 | 12/1968 | Bauer | 252/62.54 |
| 3,437,510 | 4/1969 | Diaz | 252/62.54 |
| 3,507,694 | 4/1970 | Eichler et al. | 252/62.54 |
| 3,558,492 | 1/1971 | Proskow | 252/62.54 |
| 3,634,252 | 1/1972 | Graham | 252/62.54 |
| 3,639,541 | 3/1972 | Ingersoll | 252/62.54 |
| 3,681,137 | 8/1972 | Nagazono | 252/62.54 |

*Primary Examiner*—Arthur P. Demers

[57] ABSTRACT

Magnetic recording compositions and elements, e.g., tapes, containing ferromagnetic particles dispersed in an organic polymeric binder, which comprises a preformed, nonreactive polyurethane, and the reaction product of a polyol and a polyfunctional isocyanate. The elements have long wear life in magnetic recording applications.

13 Claims, No Drawings

MAGNETIC TAPE BINDER FROM A POLYURETHANE, A POLYOL AND AN ISOCYANATE

BACKGROUND OF THE INVENTION

1. Field of the Invention

This invention relates to magnetic recording members, e.g., magnetic tapes, and particularly to new and improved binder compositions for such members, 2. Description of the Prior Art The use of preformed, nonreactive polyurethanes as components of resin binders for magnetic compositions is known, for example, in combination with vinylidene chloride/acrylonitrile copolymers, in U.S. Pat. No. 3,144,352, and in combination with vinyl chloride/vinyl acetate copolymers, in U.S. Pat. No. 3,412,044. It is also known to form polyurethane resins in situ by the reaction of a polyol and an isocyanate and to use the polyurethane resin so formed either alone or in combination with other resins as binders for magnetic compositions, e.g. U.S. Pat. Nos. 2,941,901, 3,149,995, 3,242,005, 3,437,510. The advances in the recording art, particularly in high speed instrumentation recording and helical scan video recording, have created the need for new binder systems for magnetic compositions with superior abrasion resistance, freedom from blocking, low friction, and the like. The present invention deals with such compositions that have excellent stability of magnetic characteristics and outstanding wear resistance so that they maintain high levels of signal output over long periods of time.

SUMMARY OF THE INVENTION

This invention relates to magnetic compositions, and to magnetic recording elements made therefrom, comprising ferromagnetic particles dispersed in a polymeric resin binder that comprises a mixture of a preformed, nonreactive polyurethane with the reaction product of a polyol and a polyfunctional isocyanate.

The invention also relates to a process for making such compositions comprising admixing the ferromagnetic particles, the polyurethane, the polyol, the isocyanate, and optional other ingredients, wherein reaction of the polyol and the isocyanate occurs after admixture with the other ingredients.

The magnetic compositions and elements of this invention possess high magnetic sensitivity, efficiency, and stability in combination with excellent mechanical properties, particularly long wear life. They are useful for a variety of magnetic recording applications, e.g., in tapes, discs, and drums for audio, video, instrumentation and computer uses, for control equipment, and as magnetic cores.

DESCRIPTION OF THE PREFERRED EMBODIMENTS

For the magnetic component of the ferromagnetic compositions and elements of this invention, there may be used any of the particulate magnetic materials known in the art, such as $\gamma$-iron oxide, chromium dioxide, or various alloys, for example, those described in U.S. Pat. Nos. 3,535,104 and 3,567,525. A preferred material is acicular, ferromagnetic, chromium dioxide having a tetragonal crystal structure of the rutile type, with a mean particle length not greater than $10\mu m$ and with no more than 10% of the particles having a length greater than $10\mu m$. The chromium dioxide crystals may, if desired, include modifying elements, and the initial particles may be treated to improve the level and stability of their magnetic characteristics. Suitable chromium dioxide materials and their magnetic properties are described in a number of patents, representative of which are U.S. Pat. Nos. 2,885,365, 2,923,683, 2,923,684, 2,923,685, 2,956,955, 3,034,988, 3,278,263, 3,512,930, and 3,529,930. The magnetic compositions and elements of the invention can contain 1 to 98% and preferably 65 to 85% by weight of ferromagnetic particles.

For the preformed, nonreactive polyurethane, preferred materials are the polyesterpolyurethanes such as are described, for example in Schollenberger, U.S. Pat. No. 2,871,218. Particularly preferred are the commercially available, preformed, nonreactive, organosoluble polyesterpolyurethane resins based on diphenylmethane diisocyanate, adipic acid, and an alkanediol having 2–4 carbon atoms, e.g., ethylene glycol, propanediol and butanediol, or mixtures of such alkanediols. Also suitable are preformed, nonreactive polyetherpolyurethane elastomers. In the magnetic compositions of this invention, the polyurethane resin comprises 25–85%, preferably 35–80%, by weight of the total binder of the composition, i.e., that portion exclusive of the ferromagnetic particles and exclusive of any substrate that may be employed.

For the polyol, there may be used any organic compound having two or more available reactive hydroxyl groups. Suitable compounds include the linear or branched aliphatic diols and triols, such as ethylene glycol, butanediol, and trimethylol propane. More preferred, because their higher molecular weight contributes to hard, tough binders, are any of a number of polymeric carboxylic esters. Such materials are made by reacting aliphatic diols or triols with aromatic or aliphatic dicarboxylic acids or mixtures thereof under such conditions that there is an excess of hydroxyl groups. The resulting polymeric carboxylic esters may have molecular weights in the range of 200 to 30,000 or more, with hydroxyl numbers in the range of 1 to 500. Many such materials are available commercially; methods for their preparation are known to those skilled in the art and do not form a part of the present invention. Also useful are addition polymers having available pendant reactive hydroxyl groups, such as the commercially available partially saponified vinyl chloride/vinyl acetate copolymer. The polyol component may constitute from 1 to 50%, preferably 2 to 45%, by weight of the binder portion of the magnetic composition.

Representative materials for the polyfunctional isocyanate component are (a) hexamethylene diisocyanate, (b) diphenylmethane diisocyanate, (c) diphenylmethane triisocyanate, (d) toluene diisocyanate, (e) polyethylene polyphenylisocyanate, (f) the $C_{36}$ diisocyanate from linoleic dimer acids, and, as preferred materials, (g) 4,4'-methylenebis(cyclohexylisocyanate) and (h) the reaction product of about 5 parts of 2,4-toluene diisocyanate and about 2 parts of trimethylolpropane. The polyfunctional isocyanate component may constitute 2 to 30%, preferably 2.5 to 25%, by weight of the binder portion of the magnetic composition.

Consequently, the reaction product of the polyol and the polyfunctional isocyanate may constitute 3 to 80%, preferably 4.5 to 70%, and more preferably 10 to 50%, by weight of the binder portion of the magnetic composition in its final form.

In addition to the foregoing, the compositions of the invention may also include other ingredients commonly employed in magnetic recording materials, such as dispersing agents, lubricants, antistatic agents, fungicides and the like. The additives should not interfere with the reaction of the polyol and the polyfunctional isocyanate, that is, they should not contain reactive groups capable of reacting with either the polyol or the isocyanate, such as, for example, hydroxyl, carboxyl, amino and substituted amino groups. A wide variety of suitable materials and amounts is within the skill of one familiar with this art.

The compositions of the invention are illustrated by the examples hereinafter, wherein parts and percentages are given by weight unless otherwise specified, and are discussed in terms of the final dry magnetic composition, i.e., ferromagnetic particles, preformed polyurethane resin, reaction product of polyol and polyfunctional isocyanate (expressed as starting amounts of each), dispersing agent, lubricant, plus any other ingredients, but exclusive of any substrate that may be employed. It will be understood, however, that the compositions may initially be made up from solutions of the various components where it is not feasible to use a given component, e.g., the preformed polyurethane resin, in its undissolved form. The solvent content of a given composition is, of course, evaporated in the course of putting the composition into the form of a useful magnetic recording member. The choice of solvent will be governed by the solubility characteristics of the resins, dispersing agents, lubricants and other materials selected for the composition. Representative solvents for the preferred resins and other components of the compositions of this invention are tetrahydrofuran, acetone, cyclohexanone, and methyl ethyl and methyl isobutyl ketones. Mixtures of two or more such solvents can be used.

In a typical procedure for preparing magnetic recording compositions according to the process of this invention, the ferromagnetic particles, a dispersing agent and a quantity of solvent are placed in a container together with an amount of Ottawa sand equal to 4–6 times the weight of the ferromagnetic particles, and the ingredients are then slurry-milled. The milling may be accomplished conveniently by the use of one or more stirring discs, e.g., two discs in tandem, rotating at peripheral speeds of 1000–2000 feet per minute. In another suitable procedure for milling, the ingredients in a closed container are shaken on a conventional paint conditioner or shaker, oscillating at about 700–1000 cycles per minute. Conventional ball-milling and pebble-milling may also be used. There are then added solutions of the preformed polyurethane and the polyol in amounts sufficient to give the desired proportion of resins in the final dry composition. After further milling or shaking, the polyfunctional isocyanate, lubricant and any other components are added, and it will frequently be desirable that the additions be made as solutions of these various ingredients. When sufficient final mixing and milling have been carried out, the dispersion may be filtered to remove the sand, deaerated, and adjusted to desired final viscosity by addition of solvent.

The dispersions prepared in this way may be cast by conventional techniques to form self-supporting films which may serve as integral magnetic recording members. Alternatively, they may be coated, e.g., by means of a doctor knife adjusted to give a coating of the desired thickness, on any suitable base material to form supported magnetic recording members. A particularly useful coating technique is the gravure-coating procedure described in U.S. Pat. No. 3,468,700, carried out with apparatus such as that described in U.S. Pat. No. 3,392,701. Among the base materials that may be used are non-magnetic metal sheets, plates, or tapes made from any of a number of organic polymeric materials having suitable characteristics of strength, dimensional stability, surface friction, and the like, all as well understood by those skilled in this art, e.g., films of cellulose acetate or of polyethylene terephthalate. In either case, i.e., supported or non-supported, the films or coatings are passed while the coating is still fluid between opposing magnets having an orienting field strength sufficient to align the magnetic particles in parallel fashion. The films or coatings containing the oriented particles are then allowed to dry at room or elevated temperature for a period of time sufficient to produce hardening of the compositions. The resulting coatings or films may then be aged under various conditions for testing their stability. When they are to be tested for magnetic properties, they may first be calendered at elevated temperature and pressure, the exact temperature and pressure varying with the particular composition of the coating and the base (if any). If the members are to be aged before testing, they will, of course, be stored for the desired length of time in an environment where the desired conditions of temperature and humidity are maintained.

The magnetic compositions and recording elements of the examples were made with ferromagnetic chromium dioxide particles prepared according to the procedures described in U.S. Pat. No. 3,278,263, with or without the modifying elements and after-treatments described in the other patents mentioned hereinbefore. Unless otherwise noted, the nonreactive, preformed polyurethane resins used in the examples were commercially available polyesterpolyurethanes made from diphenylmethane diisocyanate, adipic acid, and butanediol or a mixture of 2–4C alkanediols.

The magnetic recording members of the examples were tested for mechanical and magnetic performance characteristics according to the following procedures:

Gross Wear: This test records the rate of degradation of the coating in micro-inches per minute for a loop of magnetic recording tape running against phosphor bronze shims under conditions adjusted so that a high-quality commercial standard tape wears at a rate of 1.0$\mu$ inch/min.

Six-Inch Wear: This test records coating wear as indicated by loss of strength of output signal. A six-inch strip of tape is shuttled back and forth at a rate of 500 passes per minute over the heads of a digital computer recorder. Loss of original signal is monitored, with results reported as the number of passes (in thousands) until loss of 50% of the original signal.

One-Meter Wear: In this test, a strip of tape one-half inch wide and one meter long is passed back and forth over the head of a helical-scan video recorder modified to provide automatic cycling of the sample tape. At the start of the test, a 3.5$\mu$m saturated signal is recorded on the tape. With the recorder in playback mode, the strength of the output signal is measured initially and after 500 passes of the sample over the head. Results are reported in terms of percent of original signal retained, with high signal retention taken as indicative of good wear resistance.

Output: Saturation output at a wavelength of 80 microinches is measured on a tape transport having record and reproduce heads like those on the Ampex FR-1400 transport (Ampex Corp., Redwood City, California) at a tape speed of 15 inches per second and a signal frequency of 187.5 kHz. The output in decibels is compared with that of a high-quality commercial iron oxide tape, and the difference (+ or −) is recorded as the output value of the test tape, e.g., a value of +2 signifies that the test tape had 2 db greater output than the reference standard tape. It must be kept in mind that this is a relative rather than an absolute test. A sample with an output value of −2 db is thus somewhat less efficient magnetically than the best commercial iron oxide tape used as a standard, but is still substantially superior to ordinary commercial iron oxide tapes, whose output values may be −5 db to −10 db as compared with the same standard.

Signal/Noise (S/N): This measure of merit provides an indication of overall magnetic performance that takes into account such factors as the nature and characteristics of the ferromagnetic particles, the efficiency and uniformity of their dispersion in the binder, the nature and quality of the final coating (e.g., hard or soft, dense or spongy), the positive or negative effects of binder components, the effect of such aftertreatments as calendering and curing and the like. As used herein, it provides a useful tool for comparing a number of compositions under similar test conditions. The test method involves comparing the output of an 80$\mu$ inch saturated signal, as described above, with the output signal from a sample of the same tape that has had no input signal, to obtain the signal/noise ratio expressed in db. The same kind of determination is then made on a reference tape of known high quality. The S/N ratios of the test tape and the standard tape are then compared. The values given for "S/N" in the examples hereinafter are, therefore, not the S/N ratios themselves but the difference between test tape S/N and standard tape S/N, expressed in db. For example, if a test tape had an S/N ratio of 65 and the standard tape had an S/N ratio of 60, the reported S/N would be given as +5 db.

Stability: The stability of the magnetic characteristics of a magnetic recording member is determined by measurement of residual intrinsic flux density, $\phi_r$, of a sample of the member when fresh and again after aging. The measurement is made on a DC ballistic-type magnetometer that is a modified form of the apparatus described by Davis and Hartenheim in Review of Scientific Instruments, 7, 147 (1936). Since the rate of degradation of magnetic properties is generally slow at normal room conditions, it is usually desirable to accelerate the test by aging the magnetic recording member at elevated temperature and humidity. Experience has shown that one day of aging at 65°C., 50% RH produces degradation equivalent to that found after about one year of aging under normal storage conditions. The stability data in the Examples are all for samples aged at 65°C., 50% RH and are reported as either $D_7$, the percent loss in $\phi_r$ after seven days of aging, or as $t_{10}$, the number of days of aging at which $\Delta\phi_r = -10\%$.

The following examples illustrate the invention.

EXAMPLE 1

This example shows a magnetic recording composition and member of the invention in the form of a magnetic tape wherein a preformed, nonreactive polyurethane and a vinylidene chloride/acrylonitrile copolymer are major binder resin components and the reaction product of a polyol and a polyfunctional isocyanate is a minor component.

In a glass bottle with a capacity of about 240 ml. were placed:

a. 12 g of chromium dioxide, b. 35 g of methylene chloride, c. 0.12 (0.8 g of a 15% solution in trichlorethylene) of a commercially available linear polymeric carboxylic ester believed to be the ethylene glycol ester of a 50/50 mixture of isophthalic and terephthalic acids, having a molecular weight of about 10,000 and a hydroxyl number of about 3, d. 30 ml of 20–30 mesh washed Ottawa sand.

The bottle was capped and the ingredients were slurry-milled for 45 minutes by shaking the bottle in a commercial paint conditioning machine operating at about 700 cycles per minute. There was then added:

c'. 0.6 g of the polyester (4.0 g of a 15% solution in trichlorethylene), and milling was continued another 45 minutes. There was then added:

e. 1.935 g (12.9 g of a 15% solution in tetrahydrofuran) of a commercially available preformed, nonreactive polyesterpolyurethane resin from 1,4-butanediol, adipic acid, and diphenylmethane diisocyanate, f. 1.89 g (6.3 g of a 30% solution in methylisobutyl ketone) of a commercially available vinylidene chloride/acrylonitrile (80/20) copolymer, d'. 30 ml of 20–30 mesh washed Ottawa sand. Milling was continued for an hour, and there were then added:

g. 0.03 g of a commercially available stearamide lubricant, h. 0.3 g (1.5 g of a 20% solution in tetrahydrofuran) of 2,4-toluene diisocyanate/trimethylolpropane (5/2).

The mixture was then shaken for one hour as before, diluted with 100 ml of methylene chloride to adjust viscosity, and shaken an additional five minutes. It was then filtered through a cloth pad supported on a metal screen having a 2$\mu$m filter rating, and cast by conventional procedures on a polyethylene terephthalate film base. While the coating was still wet, the coated film was passed between opposing magnets having an orienting magnetic field of about 900 gauss to align the chromium dioxide particles. The oriented layer was then dried overnight at room temperature. The dry layer was calendered with one pass between a cotton-filled roll and a polished chrome-plated steel roll having its surface at a temperature of about 105°C. at a pressure of 1000–1200 lbs. per linear inch, with the coated side of the film in contact with the polished roll. The approximate composition of the dry magnetic coating, exclusive of the supporting film, was 71% chromium dioxide and 29% total binder.

For comparative purposes, the same materials and procedures were used to make two tapes wherein the polyester polyol was omitted and its place was taken by other binder components known in the prior art. Compositions and test results of the three tapes are given in Table 1, wherein percentages are rounded to the nearest tenth.

TABLE 1

| Overall composition, percent by weight | Example 1 | Control A | Control B |
|---|---|---|---|
| Chromium dioxide | 71.1 | 71.1 | 71.1 |
| Binder | 28.9 | 28.9 | 28.9 |
| Binder portion, percent by weight | | | |
| (c) Polyester polyol | 14.8 | None | None |
| ($c_1$) Methyl methacrylate/2-methyl-5-vinyl pyridine (90/10) copolymer | None | 14.8 | None |
| ($c_2$) Soya lecithin | None | None | 14.8 |
| (d) Preformed polyurethane resin | 39.7 | 39.7 | 39.7 |
| (f) Vinylidene chloride/acrylonitrile (30/20) copolymer | 38.8 | 38.8 | 38.8 |
| (g) Stearamide | 0.6 | 0.6 | 0.6 |
| (h) Polyfunctional isocyanate | 6.2 | 6.2 | 6.2 |
| Properties | | | |
| Gross wear, $\mu$''/min. | 4.6 | 20 | 1.9 |
| Stability, $t_{10}$ days | 12.8 | 14 | 3.1 |

It will be seen that Control B has desirably low gross wear as compared with the 1.0 $\mu$ inch/min. of a high-quality standard tape, but that its magnetic stability is deficient. Control A, containing a known tertiary amine polymer as a stabilizing agent, shows the expected gain in stability but with a severe loss in durability. Example 1 shows the advantage of this invention in retaining stability together with a five-fold improvement in wear resistance.

EXAMPLE 2

This example, employing the same materials and procedures as Example 1, compares a prior art composition, wherein a preformed polyurethane is the only binder resin, with a composition of this invention, wherein half of the polyurethane resin is replaced by a polyol. Compositions and properties are given in Table 2. The tape of this invention retained good stability with a three-fold improvement in wear.

Table 2

| Overall composition, percent by weight | Example 2 | Control C |
|---|---|---|
| Chromium dioxide | 73 | 73 |
| Binder | 27 | 27 |
| binder portion, percent by weight | | |
| Preformed polyurethane of Example 1 | 36.8 | 73.2 |
| Polyester polyol of Example 1 | 36.8 | None |
| Polyfunctional isocyanate of Example 1 | 6.3 | 6.6 |
| Methyl methacrylate copolymer of Control A | 18.9 | 19.1 |
| Stearamide | 1.1 | 1.1 |
| Properties | | |
| Gross wear, $\mu$''/min. | 5 | 15 |
| Stability, $t_{10}$, days | 8 | 10.5 |

EXAMPLE 3

In a porcelain jar with a capacity of about 1500 ml there were placed:

a. 1γ5 ml of tetrahydrofuran, b. about 220 ml of one-half-inch-diameter ceramic balls, c. 94 g of chromium dioxide, and d. 3.76 g of soya lecithin.

The jar was capped and the ingredients were ball-milled for three days at room temperature. To the contents of the jar were then added:

e. 0.28 g of stearamide, f. 13.325 g dry basis (88.8 g of a 15% by weight solution in tetrahydrofuran) of the polyesterpolyurethane of Example 1, g. 13.325 g dry basis (44.4 g of a 30% by weight solution in tetrahydrofuran) of the vinylidene chloride/acrylonitrile copolymer of Example 1, h. 3.25 g dry basis (22.0 g of a 15% by weight solution in tetrahydrofuran) of a commercially available polymeric carboxylic ester having a molecular weight of about 20,000 and a hydroxyl number of about 10, the reaction product of ethylene glycol with a mixture of aliphatic and aromatic dibasic acids (40/40/10/10-terephthalic/isophthalic/sebacic/adipic), i. 1 ml of amyl alcohol, and j. 440 ml ceramic balls.

The jar was again capped and the ingredients were ball-milled for four days at room temperature. There were then added:

k. 2.60 g dry basis (13.0 g of a 20% by weight solution in an 82/18 mixture of tetrahydrofuran/methyl isobutyl ketone) of the polyfunctional isocyanate of Example 1, and l. 10 ml of tetrahydrofuran.

The contents of the jar were stirred for an hour, diluted by addition of 33 ml of tetrahydrofuran, stirred again, and filtered.

The composition thus prepared was used to prepare a magnetic tape by the coating, magnetic orienting, calendering, and drying procedures of Example 1. The composition of the tape, exclusive of the substrate, was 72% chromium dioxide and 28% total binder. The composition of the binder portion alone was:

| | |
|---|---|
| Preformed polyurethane | 36.5% |
| Polyester polyol | 8.9% |
| Polyfunctional isocyanate | 7.1% |
| Vinylidene chloride copolymer | 36.5% |
| Soya lecithin | 10.3% |
| Stearamide | 0.8% |

In the gross wear test, this tape had a wear rate of 0.022 $\mu$ inch/min., substantially superior to the wear rate of prior art tapes. The tape also displayed good runnability on conventional tape transport equipment.

EXAMPLES 4–5

These examples show compositions of the invention, made by procedures already described, wherein the binder contains equal parts of a preformed polyurethane and a polyol. Compositions and properties are given in Table 3. The high stability and low wear illustrate the advantages of the invention, as compared with the prior art controls of the preceding examples.

Table 3

| Overall composition, weight percent | Example 4 | Example 5 |
|---|---|---|
| Chromium dioxide | 72.4 | 67.4 |
| Binder | 27.6 | 32.6 |
| Binder portion, weight percent | | |
| Preformed polyurethane of Example 1 | 38.4 | 41.1 |
| Polyester polyol of Example 3 | 38.4 | 41.1 |
| Polyfunctional isocyanate of Example 1 | 3.1 | 2.4 |
| Styrene/2-methyl-5-vinyl pyridine (50/50) copolymer | 18.4 | 14.5 |
| Stearamide | 1.1 | 0.9 |
| Properties | | |
| Gross wear, $\mu$''/min. | 2.1 | 1.4 |
| Stability, $t_{10}$, days | 19 | 21.8 |

EXAMPLES 6–7

Preformed polyurethanes and polyols were combined in a ratio of about 4/3 and compared with a prior art composition. Materials and procedures employed were those already described. Compositions and test results are given in Table 4, and show pronounced improvement in both wear and magnetic performance for the tapes of this invention.

Table 4

| | Example 6 | Example 7 | Control D |
|---|---|---|---|
| Chromium dioxide, percent by weight | 75.2 | 75.2 | 72.1 |
| Binder portion, percent by weight: | | | |
| Preformed polyurethane of Example 1 | 45.4 | 45.4 | 41.7 |
| Polyol | 34.0[1] | 34.0[2] | None |
| Polyfunctional isocyanate of Example 1 | 7.6 | 7.6 | 6.5 |
| Vinylidene chloride copolymer of Example 1 | None | None | 40.7 |
| Soya lecithin | 12.1 | 12.1 | 10.3 |
| Stearamide | 0.9 | 0.9 | 0.8 |
| Properties: | | | |
| Wear, 6" test, thousands of cycles to 50% signal loss | 51 | 64 | 14 |
| Output, db, relative to standard | −0.9 | +0.1 | −4 |

[1]Polyester of Example 1
[2]Polyester of Example 3

EXAMPLES 8–9

These examples also employed the preformed polyurethane and the polyols in a 4/3 ratio, but used a different prior art dispersing agent in place of soya lecithin. Compositions and results are given in Table 5, and show significant improvement in wear life with substantially no loss in magnetic stability.

Table 5

| | Examples 8 | Examples 9 | Control E |
|---|---|---|---|
| Chromium dioxide, percent by weight | 73.1 | 73.1 | 71.1 |
| Binder portion, percent by weight: | | | |
| Preformed polyurethane of Example 1 | 43.8 | 43.8 | 39.6 |
| Polyester polyol | 32.3[1] | 32.3[2] | None |
| Polyfunctional isocyanate of Example 1 | 6.8 | 6.8 | 6.1 |
| Vinylidene chloride copolymer of Example 1 | None | None | 38.7 |
| Methyl acrylate/2-methyl-5-vinyl pyridine (85/15) copolymer | 16.3 | 16.3 | 14.8 |
| Stearamide | 0.8 | 0.8 | 0.7 |
| Properties | | | |
| Gross wear, μ''/min | 1.7 | 1.0 | 5.0 |
| Six-inch wear, thousands of cycles to 50% signal loss | 124 | 59 | No data |
| Stability, $t_{10}$, days | 11 | 10.5 | 12 |

[1]Polyester of Example 1
[2]Polyester of Example 3

EXAMPLES 10–11

These examples compare compositions of the invention, wherein a preformed polyurethane and a polyol are combined in a ratio of about 3/1, with a prior art composition having the polyurethane as the only binder resin. Compositions and results are given in Table 6, and show improvement in both wear life and magnetic stability for the tapes of the invention.

Table 6

| | Example 10 | Example 11 | Control F |
|---|---|---|---|
| Chromium dioxide, percent by weight | 74 | 74 | 74 |
| Binder portion, percent by weight: | | | |
| Preformed polyurethane of Example 1 | 56.8 | 56.8 | 76 |
| Polyol | 19.2[1] | 19.2[2] | None |
| Polyfunctional isocyanate of Example 1 | 3.3 | 3.3 | 3.3 |
| Methyl acrylate copolymer of Example 8 | 19.9 | 19.9 | 19.9 |
| Stearamide | 0.9 | 0.9 | 0.9 |
| Properties | | | |
| Gross wear, μ''/min. | 0.8 | 0.4 | 1.2 |
| Stability, $t_{10}$, days | 11 | 11 | 9.5 |

[1]Polyester of Example 1
[2]Polyester of Example 3

EXAMPLES 12–13

These examples show polyurethane and polyol combined in a ratio of about 5/2 in compositions with a chromium dioxide content of 78% by weight, higher than that of previous examples. The preformed polyurethane used in these examples was essentially like that of Example 1, i.e., the reaction product of diphenylmethane diisocyanate, adipic acid, and diol, except that the diol component was a mixture of alkanediols having 2–4 carbon atoms rather than 1,4-butanediol alone. Compositions of the binder portions and test data are given in Table 7.

Table 7

| | Example 12 | Example 13 |
|---|---|---|
| Binder portion, percent by weight: | | |
| Preformed polyurethane as described, from mixture of 2-4C alkanediols | 53.3 | 53.3 |
| Polyol: | | |
| Polyester of Example 1 | 22.9 | None |
| Polyester of Example 3 | None | 22.9 |
| Polyfunctional isocyanate of Example 1 | 9.1 | 9.1 |
| Soya lecithin | 14.2 | 14.2 |
| Stearamide | 0.5 | 0.5 |
| Properties | | |
| Cross wear, μ''/min. | 0.08 | 0.05 |
| Stability, $t_{10}$, days | No data | 12 |
| Output, db relative to standard | +1.1 | +3.1 |

When compared with the controls of preceding examples, these tapes show remarkable durability, response, and stability as advantages of this invention.

EXAMPLES 14–16

These examples show polyurethane and polyol combined in a ratio of about 4/1. All of the examples contained 79% of chromium dioxide, 58.7% of the preformed polyurethane of Example 1, 15.7% of the polyfunctional isocyanate of Example 1, 10.9% of soya lecithin, 0.9% of stearamide, and 13.8% of polyol, as indicated in Table 8, where test results are also given.

Table 8

| Example | Polyol | Gross Wear, μ''/min. | Stability, $t_{10}$, days |
|---|---|---|---|
| 14 | Polyester of Example 1 | 0.5 | 7.1 |
| 15 | Polyester of Example 3 | 0.8 | 6.6 |
| 16 | Polyester reaction product of polyethylene glycol and the dimethyl ester of terephthalic | 0 | 6.6 |

Table 8-continued

| Ex-ample | Polyol | Gross Wear, μ''/min. | Stability, $t_{10}$, days |
|---|---|---|---|
| | acid, wherein about 2% of the acid has a sodium sulfonate substituent in the 5 position. | | |

EXAMPLES 17–19

These examples show polyurethane and polyol combined in ratios of 10/1 and as high as nearly 40/1. All of the examples contained 79% of chromium dioxide, 73.2% of the preformed polyurethane of Example 1, 10.9% of soya lecithin, and 0.9% of stearamide. Other components and test results are shown in Table 9.

Table 9

| | Example 17 | 18 | 19 |
|---|---|---|---|
| Components, percent by weight: | | | |
| Polyester of Example 3 | 6.9 | None | None |
| Polyester reaction product of ethylene glycol with a mixture of aromatic and aliphatic dibasic acids (33/17/50-terephthalic/-isophthalic/sebacic | None | 6.9 | None |
| Ethylene glycol | None | None | 1.9 |
| Polyfunctional isocyanate of Example 1 | 8.0 | 8.0 | 13.0 |
| Properties | | | |
| Gross wear, μ''/min. | 1.3 | 0.03 | 0.2 |
| Stability, $D_7$, % loss in $\phi_r$ | 7.4 | 5.9 | 7.5 |
| Output, db, relative to standard | −0.4 | +2.1 | −1.5 |

EXAMPLES 20–22

These examples show compositions in which two polyols are combined in ratios of greater than 20/1, and with a ratio of preformed polyurethane to total polyol content of about 3/1. Materials and procedures of previous examples were used. Compositions and test results are given in Table 10.

Table 10

| Composition | Example 20 | 21 | 22 |
|---|---|---|---|
| Chromium dioxide, percent by weight | 78.0 | 79.1 | 79.0 |
| Binder portion, percent by weight | | | |
| Preformed polyurethane of Example 1 | 62.8 | 58.9 | 58.8 |
| Polyols: | | | |
| Polyester of Example 3 | 19.3 | 19.3 | None |
| Polyester of Example 18 | None | None | 19.4 |
| Ethylene glycol | 0.9 | 0.8 | 0.8 |
| Polyfunctional isocyanate of Example 1 | 9.1 | 9.2 | 9.2 |
| Soya lecithin | 7.1 | 10.9 | 10.9 |
| Stearamide | 0.8 | 0.9 | 0.9 |
| Properties | | | |
| Gross wear, μ''/min. | 1.1 | 0.4 | 0.09 |
| Stability, $D_7$, % loss in $\phi_r$ | 6.7 | 8 | 7.3 |

EXAMPLE 23

This example contained 78.3% chromium dioxide in a binder comprising 56.4% of a commercially available nonreactive, preformed polyetherpolyurethane in place of the polyesterpolyurethanes of preceding examples, and as the polyol 23.1% of a commercially available vinyl chloride/vinyl acetate copolymer partially saponified to a 2.3% hydroxyl content, i.e., vinyl chloride/vinyl acetate/vinyl alcohol (91/3/6). Other components were 9.2% of the polyfunctional isocyanate of Example 1, 10.5% soya lecithin, and 0.8% stearamide. Gross wear = 0.17 μ inch/min. Stability, $D_7$, % loss of $\phi_r$ = 7.5. Output, db, relative to standard = +1.

EXAMPLES 24–27

These compositions, all with about 80% chromium dioxide, show various combinations of the saponified copolymer polyol of Example 23 with the polyesterpolyurethane of Example 1, and also illustrate other suitable binder components. All tapes were calendered two passes at 105°C. and 1100 pounds per linear inch, then held for 20 hours at 65°C. before testing. Binder compositions and test results are given in Table 11.

Table 11

| | Example 24 | 25 | 26 | 27 |
|---|---|---|---|---|
| binder portion, percent by weight: | | | | |
| Polyurethane of Example 1 | 57.1 | 48 | 48 | 43 |
| Polyol of Example 23 | 21.3 | 25 | 25 | 30 |
| Polyfunctional isocyanate of Example 1 | 8.2 | 8 | 8 | 8 |
| Soya lecithin | 5.1 | 10 | 10 | 10 |
| Butyl Stearate | 8.2 | 8 | None | 8 |
| Isopropyl myristate | None | None | 8 | None |
| Stearamide | None | None | None | 0.4 |
| Properties: | | | | |
| Wear, one-meter test, % signal retained after 500 passes | 87 | 82 | 80 | 81 |
| Stability, $D_7$, % loss in $\phi_r$ | 6.2 | 11.4 | — | — |

EXAMPLE 28

This example illustrates a different polyol, trimethylolpropane, in a composition containing 80% chromium dioxide and a polyurethane/polyol ratio of 30/1. The composition of the binder portion was 68.1% of the preformed polyurethane of Example 1, 2.3% of trimethylolpropane as the polyol, 14.6% of the polyfunctional isocyanate of Example 1, 10.7% of soya lecithin, 3.9% of butyl stearate, and 0.4% of stearamide. Stability, $D_7$ = 7.3. S/N, db, test vs. standard = +3.0. Wear, one-meter test, % signal retained = 68.

EXAMPLES 29–32

These examples illustrate a different polyfunctional isocyanate, 4,4'-methylene-bis-(cyclohexylisocyanate), in combination with two of the polyols of preceding examples, and at two polyurethane/polyol/isocyanate ratios with two different levels of chromium dioxide content. Compositions and test results are given in Table 12.

Table 12

| | Example 29 | 30 | 31 | 32 |
|---|---|---|---|---|
| Composition, percent by weight: | | | | |
| Chromium dioxide | 74 | 73.4 | 78.6 | 78.4 |

Table 12-continued

| | Example 29 | 30 | 31 | 32 |
|---|---|---|---|---|
| Binder portion: | | | | |
| Preformed polyurethane of Example 1 | 44.9 | 44.0 | 57.4 | 56.7 |
| Polyester of Example 1 | 35.1 | None | 19.9 | None |
| Polyester of Example 3 | None | 36.6 | None | 20.9 |
| 4,4'-methylene-bis-(cyclohexyl isocyanate) | 7.4 | 7.2 | 7.1 | 7.0 |
| Soya lecithin | 11.3 | 11.0 | 14.7 | 14.5 |
| Octyl stearate | None | 1.2 | None | None |
| Butyl laurate | 1.4 | None | None | None |
| Stearamide | None | None | 0.94 | 0.93 |
| Properties: | | | | |
| Stability, $t_{10}$, days | 21.0 | 20.1 | 16 | 12.1 |
| Output, db, relative to standard | –0.9 | –2.4 | –1.4 | –0.4 |
| Wear | | | | |
| Gross wear, $\mu''$/min. | 0.9 | 0.6 | 0.0 | 0.1 |
| One-meter test, % signal retained | n.d.* | n.d. | n.d. | 83 |

*n.d. = no data

EXAMPLES 33–37

These examples illustrate compositions incorporating commercially available polymeric carboxylic ester polyols of relatively low molecular weight as compared with the polyesters used in preceding examples. All of these examples contained 74.7% chromium dioxide, 8.5% soya lecithin, and 0.7% stearamide, and had an isocyanate/polyol molar equivalent ratio of 1.6/1. The polyester polyols used were as follows:

Example 33 - Strongly branched reaction product of triols and dibasic acids, e.g., adipic and phthalic, hydroxyl number = 390–420, M.W. = about 450.

Example 34 - Strongly branched reaction product of triols with adipic and phthalic acids, hydroxyl number = 270–290, M.W. = about 550.

Example 35 - Moderately branched reaction product of diols and triols with adipic acid, hydroxyl number = 205–221, M.W. = about 650.

Example 36 - Partially branched reaction product of diols and triols with adipic acid, hydroxyl number = 158–175, M.W. = about 800.

Example 37 - Essentially linear reaction product of diols and dibasic acids, hydroxyl number = 45–52, M.W. = about 2500.

Remaining details of the compositions are given in Table 13, together with the test results.

Table 13

| Binder components, percent by weight | 33 | 34 | 35 | 36 | 37 |
|---|---|---|---|---|---|
| Preformed polyurethane of Example 1 | 60.8 | 60.8 | 67.4 | 53.2 | 60.7 |
| Polyester polyol as described | 6.7 | 8.7 | 8.7 | 13.9 | 21.3 |
| Polyfunctional isocyanate of Example 1 | 23.3 | 21.3 | 14.8 | 23.6 | 8.8 |
| Properties | | | | | |
| Gross wear, $\mu''$/min | 1.9 | 0.2 | 1.0 | 0.8 | 0.0 |
| Stability, $D_7$, % loss in $\phi_r$ | 4.1 | 5.7 | 6.7 | 6.0 | 8.1 |
| Output, db, relative to standard | –1.5 | +1.1 | +2.9 | 0 | –1.5 |

EXAMPLES 38–40

The compositions of these examples contained 80% of chromium dioxide and 11% soya lecithin, and had an isocyanate/polyol molar equivalent ratio of 1.3/1. Additional details of the compositions and test results appear in Table 14.

Table 14

| | Example 38 | 39 | 40 |
|---|---|---|---|
| Binder components, percent by weight: | | | |
| Preformed polyurethane of Example 1 | 63.4 | 60.2 | 52.2 |
| Polyester polyol | 7.2[1] | 10.2[2] | 13.9[3] |
| Polyfunctional isocyanate of Example 1 | 14.5 | 14.6 | 14.9 |
| Butyl stearate | 4.1 | 4.2 | 8.0 |
| Stearamide | None | 0.4 | None |
| Fungicide[4] | 0.1 | None | None |
| Properties: | | | |
| Gross wear, $\mu''$/min. | <0.1 | No data | <0.1 |
| Stability, $D_7$, % loss in $\phi_r$ | 10 | 5.9 | 8.7 |
| S/N, db, relative to standard | +9.0 | +2.5 | +7.5 |

[1]Polyester of Example 33
[2]Polyester of Example 34
[3]Polyester of Example 35
[4]A commercial product believed to be the ferric derivative of 1-hydroxypyridine-2-thione.

EXAMPLES 41–43

The compositions of these examples contained 80% chromium dioxide in a binder wherein the ratio of polyurethane/polyol/isocyanate was 57/14/15 with varying molar equivalent ratios of isocyanate/polyol. Details of the compositions and test results are given in Table 15.

Table 15

| Binder composition, percent by weight: | Example 41 | 42 | 43 |
|---|---|---|---|
| Preformed polyurethane of Example 1 | 56.7 | 56.5 | 56.7 |
| Polyester polyol | 13.7[1] | 13.7[2] | 13.7[3] |
| Polyfunctional isocyanate of Example 1 | 14.7 | 14.7 | 14.7 |
| Isocyanate/polyol molar ratio | 1.3 | 1.65 | 6.2 |
| Soya lecithin | 10.8 | 10.7 | 10.8 |
| Butyl stearate | 4.0 | 4.0 | 4.0 |
| Stearamide | None | 0.4 | None |
| Fungicide of Example 38 | 0.1 | 0.1 | 0.1 |
| Properties: | | | |
| Cross wear, $\mu''$/min. | <0.1 | No data | 0 |
| Stability, $D_7$, % loss in $\phi_r$ | 5.6 | 7.2 | 11.1 |
| S/N, db, relative to standard | +6 | +2.5 | +9.5 |

[1]Polyester of Example 35.
[2]Polyester of Example 36.
[3]Linear polyester similar to that of Example 37, hydroxyl number 32 41-47, M.W. = about 2500.

EXAMPLES 44–48

The compositions of these examples all contained chromium dioxide at a nominal level of 75% (range = 73.97–75.95%) in binders containing the polyester polyol of Example 35 in combination with various amounts and ratios of other components from preceding examples, as shown in Table 16, where test results are also given.

Table 16

| Binder composition, percent by weight: | 44 | 45 | 46 | 47 | 48 |
|---|---|---|---|---|---|
| Polyurethane of Example 1 | 67.0 | 67.2 | 63.6 | 52.6 | 77.0 |
| Polyester polyol of Example 35 | 3.3 | 11.0 | 14.0 | 11.8 | 6.5 |
| Polyfunctional isocyanate of Example 1 | 3.8 | 12.5 | 15.9 | 21.2 | 7.5 |
| Soya lecithin | 20.0[1] | 8.6 | 5.7 | 6.3 | 8.4 |
| Stearamide | 5.7[2] | 0.7 | 0.9 | 0.6 | 0.7 |
| Squalane[3] | None | None | None | 7.5 | None |
| Properties: | | | | | |
| Gross wear, $\mu''$/min. | 0.01 | 0.4 | 0.0 | 0.0 | 0.0 |
| Stability, $D_7$, % loss in $\phi_r$ | 4.1 | — | 5.6 | 6.4 | 7.6 |
| $t_{10}$, days | — | 7.5 | — | — | — |
| Output, db, relative to standard | −2.9 | +0.3 | +4.9 | +0.5 | −1 |

[1]Methyl acrylate polymer of Example 8 in place of soya lecithin.
[2]Oleamide in place of stearamide.
[3]2,6,10,15,19,23-hexamethyl tetracosane.

EXAMPLES 49–52

The compositions of these examples all contained 80% of chromium dioxide, and the binder portion considered alone contained 56% of the preformed polyurethanes of Example 1, 14% polyol, 15% of the polyfunctional isocyanate of Example 1, 11% soya lecithin, and 0.4% stearamide. In Examples 49–51, the polyol was the polyester of Example 33. In Example 52, the polyol component consisted of equal parts by weight (7% each) of the polyesters of Examples 33 and 43. The tapes made from these compositions showed excellent durability as indicated by the high percentage of signal retained in the one-meter wear test previously described. Other components of the binders and the test results were as follows:

| Example | Adjuvants | Wear, 1m test, % signal retained |
|---|---|---|
| 49 | 4% butyl stearate | 76 |
| 50 | 8% isopropyl myristate | 75 |
| 51 | 8% isopropyl palmitate | 77 |
| 52 | 8% butyl stearate | 77 |

EXAMPLES 53–63

The compositions of these examples contained 80% of chromium dioxide in binders having the detailed compositions set forth in Table 17, wherein for convenience in tabulation, PU is the preformed polyurethane of Example 1, PO is the polyester of Example 35, and PI is the polyfunctional isocyanate of Example 1. In addition to the components shown in Table 17, all of these compositions also contained 11% soya lecithin and, except Examples 55 and 63, 0.4% stearamide. The tapes made from these compositions exhibited excellent durability as indicated by the high percentage of signal retained in the one-meter wear test.

Table 17

| Example | PU % | PO % | PI % | Adjuvants | Stab. $D_7$, % | S/N db | Wear, 1m, % Signal Retained |
|---|---|---|---|---|---|---|---|
| 53 | 47 | 14 | 20 | 8% butyl stearate | 8.0 | +4.0 | 77 |
| 54 | 50 | 20 | 15 | 4% butyl stearate | 8.0 | n.d.[2] | 78 |
| 55 | 52 | 14 | 15 | 8% isopropyl myristate | 8.0 | +6.0 | 78 |
| 56 | 52 | 14 | 20 | 4% butyl stearate | 7.2 | +1.0 | 77 |
| 57 | 56 | 10 | 20 | 4% butyl stearate | 6.0 | n.d. | 76 |

Table 17-continued

| Example | PU % | PO % | PI % | Adjuvants | Stab. $D_7$, % | S/N db | Wear, 1m, % Signal Retained |
|---|---|---|---|---|---|---|---|
| 58[1] | 56 | 14 | 15 | 4% butyl stearate | n.d. | n.d. | 89 |
| 59 | 56 | 14 | 15 | 4% butyl stearate | 10 | n.d | 76 |
| 60 | 56 | 14 | 15 | 6% butyl stearate | n.d. | n.d. | 80 |
| 61 | 56 | 14 | 15 | 8% butyl stearate | n.d. | n.d. | 79 |
| 62 | 56 | 20 | 10 | 4% butyl stearate | 4.0 | n.d. | 76 |
| 63 | 59 | 14 | 15 | 2% squalane | n.d. | +2.0 | 79 |

[1]75% $CrO_2$
[2]n.d. = no data

From the foregoing it will be seen that magnetic recording compositions and elements made therefrom wherein the binder comprises a nonreactive preformed polyurethane and the reaction product of a polyol and a polyfunctional isocyanate according to this invention possess a high and stable level of magnetic characteristics, and particularly they have significantly improved durability as compared with prior art compositions and members. The high quality and long wear life of the recording members of this invention recommend them for use in flexible recording media, such as magnetic tapes for audio and instrumentation recording, and especially for uses where rigorous wear conditions are encountered, as in various computer applications and in helical-scan video recording. The compositions of the invention are also useful for the manufacture of magnetic drums, discs, and the like, where wear life is not so important as for tapes, but where a high and stable level of magnetic properties is very desirable.

What is claimed is:

1. In a magnetic recording composition of the type comprising a plurality of ferromagnetic particles dispersed in a polymeric resin binder, the improvement wherein said binder is formed by the reaction of a polyol and a polyfunctional isocyanate in the presence of a preformed, non-reactive polyurethane, said nonreactive polyurethane being selected from the group consisting of polyetherpolyurethane and polyesterpolyurethane and said polyol being selected from the group consisting of linear or branched aliphatic diols and triols, polymeric carboxylic esters having a molecular weight greater than 200 and hydroxyl numbers in the range 1 to 500, and addition polymers having available pendant reactive hydroxyl groups, the total binder composition comprising 1 to 50% by weight of the polyol constituent, 2 to 30% by weight of the polyfunctional isocyanate constituent, and 25 to 85% by weight of the polyurethane constituent.

2. The magnetic recording composition of claim 1 wherein said preformed, nonreactive polyurethane is an organosoluble polyesterpolyurethane based on diphenylmethane diisocyanate, adipic acid and an alkanediol having 2–4 carbon atoms or mixtures of such alkanediols.

3. The magnetic recording composition of claim 1 wherein said binder contains from about 3 to about 80% by weight of said reaction product.

4. The magnetic recording composition of claim 3 wherein said polyfunctional isocyanate is selected from the group consisting of hexamethylene diisocyanate, diphenylmethane diisocyanate, diphenylmethane triisocyanate, toluene diisocyanate, polyethylene polyphenylisocyanate, the $C_{36}$ diisocyanate from linoleic dimer acids, 4,4'-methylene-bis-(cyclohexylisocyanate) and the reaction product of about 5 parts of 2,4-toluene diisocyanate and about 2 parts of trimethylolpropane.

5. The magnetic recording composition of claim 1 wherein said binder comprises about 35 to about 80% by weight of said preformed, nonreactive polyurethane and about 10 to about 50% by weight of said reaction product.

6. The magnetic recording composition of claim 5 wherein said preformed, nonreactive polyurethane comprises an organosoluble polyesterpolyurethane resin based on diphenylmethane diisocyanate, adipic acid and an alkanediol having 2–4 carbon atoms or mixtures of such alkanediols; said polyol is a polymeric carboxylic ester; said polyfunctional isocyanate is the reaction product of about 5 parts of 2,4-toluene diisocyanate and about 2 parts of trimethylolpropane; and said ferromagnetic particles are particles of acicular chromium dioxide.

7. In a process for making a magnetic composition of the type comprising admixing about 1 to about 98% by weight of ferromagnetic particles with about 2 to about 99% by weight of a binder composition, the improvement wherein said ferromagnetic particles are mixed with a mixture of a preformed, nonreactive polyurethane, a polyol and a polyfunctional isocyanate in a manner such that said polyol and said polyfunctional isocyanate react to form a reaction product after their admixture with the other ingredients, said nonreactive polyurethane being selected from the group consisting of polyetherpolyurethane and polyesterpolyurethane and said polyol being selected from the group consisting of linear or branched aliphatic diols and triols, polymeric carboxylic esters having a molecular weight greater than 200 and hydroxyl numbers in the range 1 to 500, and addition polymers having available pendant reactive hydroxyl groups, the total binder composition comprising 1 to 50% by weight of the polyol constituent, 2 to 30% by weight of the polyfunctional isocyanate constituent, and 25 to 85% by weight of the polyurethane constituent.

8. The process of claim 7 wherein said preformed, nonreactive polyurethane is an organosoluble polyesterpolyurethane based on diphenylmethane diisocyanate, adipic acid and an alkanediol having 2–4 carbon atoms or mixtures of such alkanediols.

9. The process of claim 7 wherein said polyfunctional isocyanate is selected from the group consisting of hexamethylene diisocyanate, diphenylmethane diisocyanate, diphenylmethane triisocyanate, toluene diisocyanate, polyethylene polyphenylisocyanate, the $C_{36}$ diisocyanate from linoleic dimer acids, 4,4'-methylene-bis-(cyclohexylisocyanate) and the reaction product of about 5 parts of 2,4-toluene diisocyanate and about 2 parts of trimethylolpropane.

10. The process of claim 7 wherein said binder composition comprises about 25 to about 85% by weight of said preformed, nonreactive polyurethane, about 2 to about 45% by weight of said polyol, and about 2.5 to about 25% by weight of said polyfunctional isocyanate.

11. The process of claim 10 wherein said binder composition comprises about 10 to about 50% by weight of said reaction product.

12. The process of claim 11 wherein said magnetic composition contains from about 65 to about 86% by weight of said ferromagnetic particles.

13. The process of claim 1 wherein: said preformed, nonreactive polyurethane comrises an organosoluble polyesterpolyurethane resin based on diphenylmethane diisocyanate, adipic acid and an alkanediol having 2–4 carbon atoms or mixtures of such alkanediols; said polyol is a polymeric carboxylic ester; said polyfunctional isocyanate is the reaction product of about 5 parts of 2,4-toluene diisocyanate and about 2 parts of trimethylolpropane; and said ferromagnetic particles are particles of acicular chromium dioxide.

* * * * *

UNITED STATES PATENT OFFICE

CERTIFICATE OF CORRECTION

PATENT NO. : 3,926,826

DATED : December 16, 1975

INVENTOR(S) : Boynton Graham and H. Gilbert Ingersoll

It is certified that error appears in the above-identified patent and that said Letters Patent are hereby corrected as shown below:

| Column | Line | |
|---|---|---|
| 20 | 1 | "claim 1" should read -- claim 12 --. |
| 20 | 2 | "comrises" should read -- comprises --. |

Signed and Sealed this

*Twenty-seventh* Day of *September 1977*

[SEAL]

*Attest:*

RUTH C. MASON
*Attesting Officer*

LUTRELLE F. PARKER
*Acting Commissioner of Patents and Trademarks*